Aug. 25, 1970      J. B. FLYNN      3,525,932

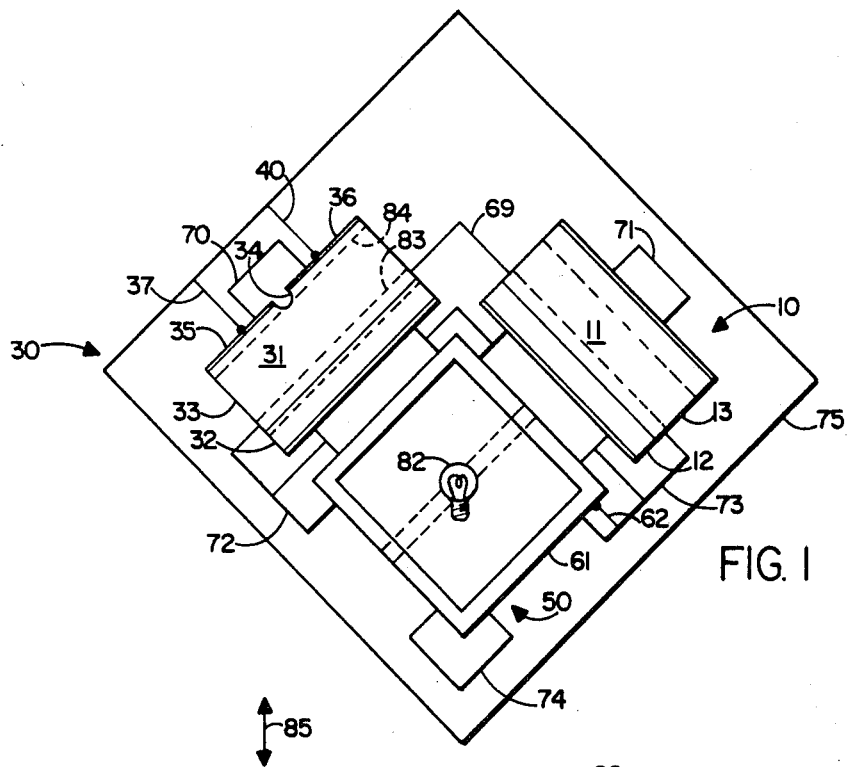

MAGNETOMETER UTILIZING A GROOVED REVERSE BIASED JUNCTION DIODE

Filed Jan. 25, 1968      3 Sheets-Sheet 2

INVENTOR.
JOHN B. FLYNN
BY *George Field*
ATTORNEY

United States Patent Office 3,525,932
Patented Aug. 25, 1970

3,525,932
MAGNETOMETER UTILIZING A GROOVED
REVERSE BIASED JUNCTION DIODE
John B. Flynn, Belmont, Mass., assignor to Honeywell
Inc., Minneapolis, Minn., a corporation of Delaware
Filed Jan. 25, 1968, Ser. No. 700,434
Int. Cl. G01r 33/02
U.S. Cl. 324—43                                    2 Claims

ABSTRACT OF THE DISCLOSURE

A magnetometer embodying no windings and no ferromagnetic materials in its sensors. A semiconductor diode is arranged for equal flow of carriers in two paths when in a given orientation with respect to a magnetic field: change in the orientation differentially varies the carrier flows in the two paths. The device may be replicated for use with respect to two or three mutually orthogonal axes, and may also sense variation in the strength of a selected component of a field of fixed direction.

---

Figure 3:
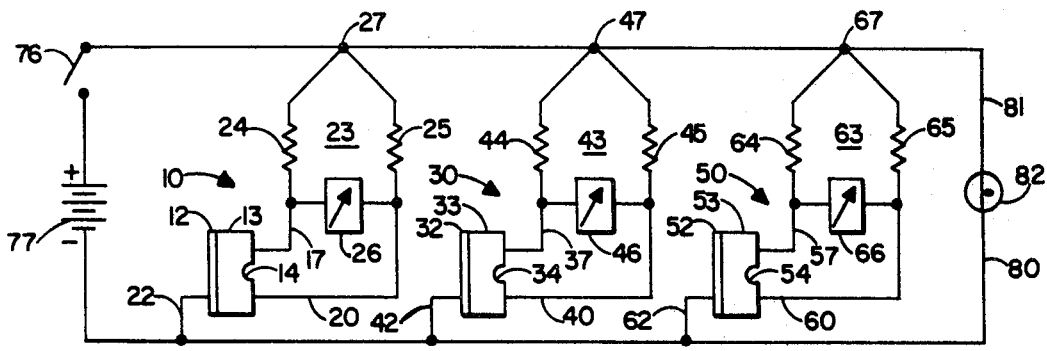

This invention relates to magnetic field responsive apparatus, and more expressly to magnetometers for performing a supervisory function, such as indication, recording, or controlling, in accordance with variation in the magnitude or direction of a magnetic field or of one of its components.

Magnetometers have long been known: in general such an instrument comprises a core of ferromagnetic material and a number of windings formed on the core. The attainable symmetry of construction of such devices and the attainable homogeneity of the ferromagnetic material, together with the stability of these characteristics, set limits to the accuracy and precision of instruments so constructed.

I have invented an instrument, making use of a property of semiconductor materials, which eliminates the need for cores and windings and is effectively a solid state device. By the use of my invention it is possible to observe, record, or control in accordance with the strength or direction of a magnetic field or the components thereof along three axes, two axes, or a single axis.

Various objects, advantages and features of novelty which characterize my invention are pointed out with particularity in the claims annexed hereto and forming a part hereof. However, for a better understanding of the invention, its advantages, and objects attained by its use, reference should be had to the drawing which forms a part hereof, and to the accompanying descriptive matter, in which I have illustrated and described certain preferred embodiments of my invention.

Figure 5:
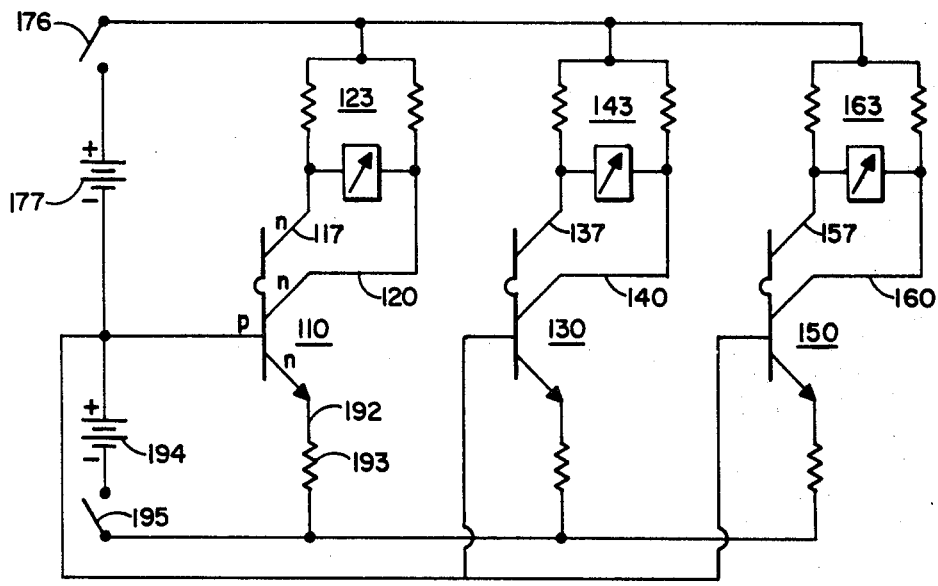
Figure 4:
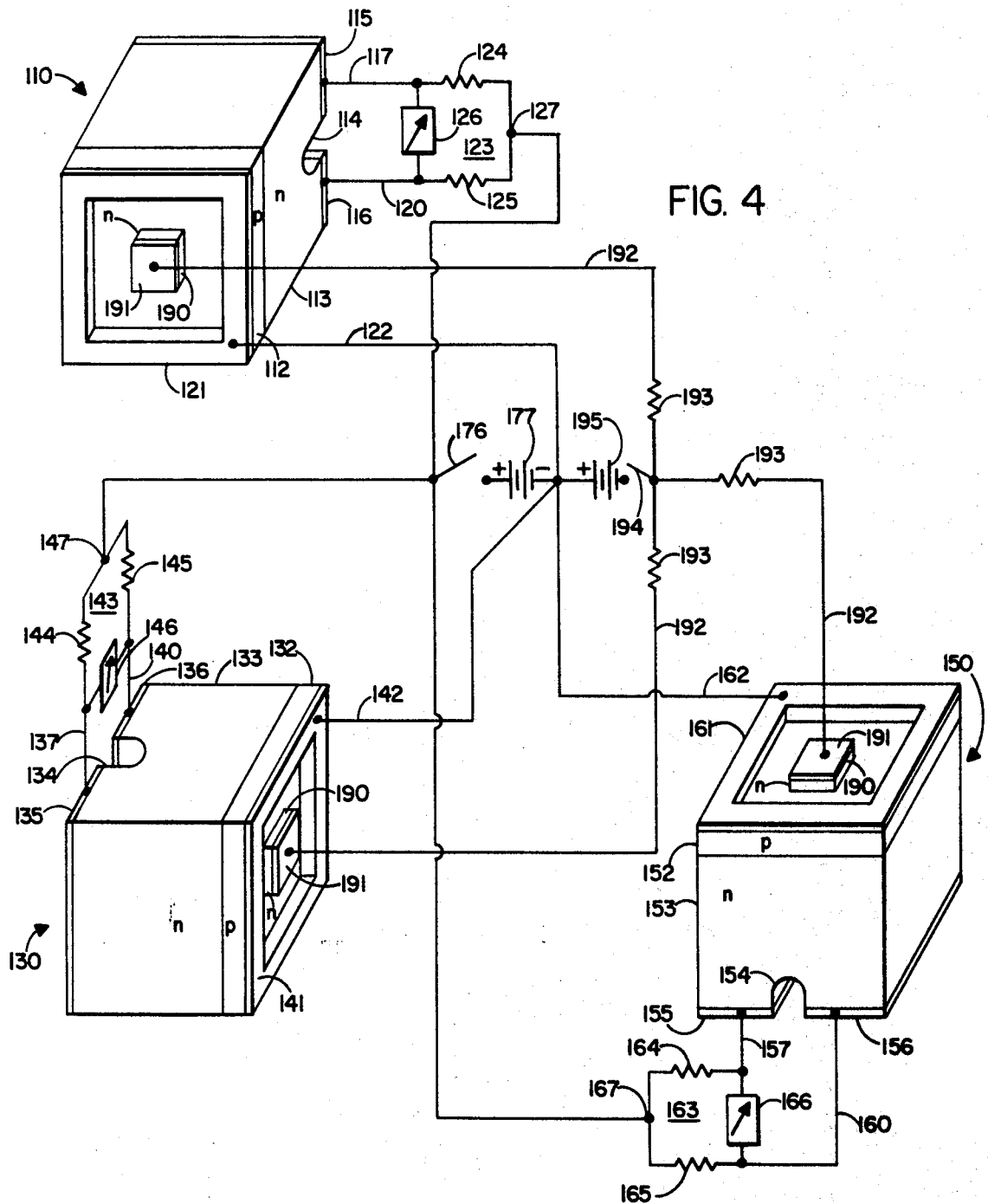

In the drawing FIGS. 1 and 2 are plan and elevational views of one embodiment of my invention, where three mutually orthogonal components of a magnetic field are of interest and where excess carriers are provided in a semiconductor material by irradiation; FIG. 3 is a wiring diagram thereof; FIG. 4 is a schematic showing of a modification of the invention, in which excess carriers are provided in the semiconductor by injection from a suitable emitter, and in which conventional mounting and orienting means are omitted for clarity of illustration; and, FIG. 5 is a wiring diagram of the modification.

The three-axis magnetometer of FIGS. 1, 2, and 3 is shown to comprise a plurality of similar units or semiconductor devices 10, 30, and 50. Unit 10 comprises a p-n junction diode 11 including a first thin, low resistivity stratum 12 of one conductivity type and a second, high resistivity stratum 13 of the opposite conductivity type. By way of illustration stratum 13 is shown as of n-type material, and stratum 12 is shown as of p-type material and has the higher impurity concentration. A groove 14 is formed in the face of stratum 13, and the two resulting face portions are metallized or otherwise suitably prepared to act as electrodes 15 and 16, to which electrical conductors 17 and 20 may be connected in any suitable manner. Similar means 21 are also provided for making electrical connection from stratum 12 to a conductor 22.

Unit 10 is associated with an output circuit 23 including a pair of resistors 24 and 25 and a utilization device 26 which for simplicity is shown as a meter. Conductors 17 and 20 are connected to the terminals of device 26, and through resistors 24 and 25 respectively, to a junction point 27.

Unit 30 comprises a p-n junction diode 31 including a first thin, low resistivity stratum 32 of one conductivity type and a second, high resistivity stratum 33 of the opposite conductivity type. Stratum 33 is shown as of n-type material and stratum 32 is shown as of p-type material and has the higher impurity concentration. A groove 34 is formed in the face of stratum 33, and the two resulting face portions are metallized or otherwise suitably prepared to act as electrodes 35 and 36 to which electrical conductors 37 and 40 may be connected in any suitable manner. Similar means 41 are also provided for making electrical connection from stratum 32 to a conductor 42.

Unit 30 is associated with an output circuit 43 including a pair of resistors 44 and 45 and a utilization device 46 which for simplicity is shown as a meter. Conductors 37 and 40 are connected to the terminals of device 46 and, through resistors 44 and 45 respectively, to a junction point 47.

Unit 50 comprises a p-n junction diode 51 including a first thin, low resistivity stratum 52 of one conductivity type and a second, high resistivity stratum 53 of the opposite conductivity type. Stratum 53 is shown as of n-type material and stratum 52 is shown as of p-type material and has the higher impurity concentration. A groove 54 is formed in the face of stratum 53, and the two resulting face portions are metallized or otherwise suitably prepared to act as electrodes 55 and 56 to which electrical conductors 57 and 60 may be connected in any suitable manner. Similar means 61 are also provided for making electrical connection from stratum 52 to a conductor 62.

Unit 50 is associated with an output circuit 63 including a pair of resistors 64 and 65 and a utilization device 66 which for simplicity is shown as a meter. Conductors 57 and 60 are connected to the terminals of device 66 and, through resistors 64 and 65 respectively, to a junction point 67.

Illustrative characteristics for a device according to the invention may be as follows:

Stratum 13 -------- n-Type silicon, thickness about 5.5 mils, impurity concentration about $1.5 \times 10^{12}$ atoms per $cm.^3$ of phosphorus donors.
Stratum 12 -------- About 0.04 mil thick. Average concentration of boron acceptors about $5 \times 10^{18}$ per $cm.^3$.
Groove 14 -------- Depth 1.0 mil, width 2.5 mil, etched.
Depletion layer --- Normal or unbiased thickness 0.1 to 1.0 mil. Thickness with 20 volt bias battery, about 5.0 mils.

Devices 10, 30, and 50 are mounted in fixed relation, with the axes of grooves 14, 34, and 54 orthogonal, by any suitable means, suggested in FIG. 1 by insulation blocks 69, 70, 71, 72, 73, and 74 carried in a carrier base member 75 and enclosed if desired in a suitable housing. The blocks, base, member, and housing must be magnetically transparent.

Junction points 27, 47, and 67 are connected through a switch 76 to the positive terminal of a battery 77 whose voltage will be fixed by the actual thickness of strata 13, 33, and 53 which are the same plus any additional voltage to enhance device performance. The negative terminal of battery 77 is connected to conductors 22, 42, and 62. Also energized from battery 77 through switch 76 are a pair of conductors 80 and 81 connected to a source of radiant energy in the form of a light bulb 82, positioned to irradiate stratum 12 of unit 10, stratum 32 of unit 30, and stratum 52 of unit 50, the wave length of the light supplied by lamp 82 being suitable to create hole-electron pairs in the irradiated strata and hence to produce excess carriers therein.

The magnitude of the voltage supplied by battery 77 is sufficient to displace one boundary of the depletion layer in each unit beyond the groove. Thus as shown in FIG. 1 one boundary of the depletion layer in stratum 33 is normally at 83; the effect of biasing battery 77 is to displace that boundary to a new position 84. Additional voltage may be applied to enhance device operation. The effect of this is to electrically isolate the portions of stratum 33 on opposite sides of groove 34, so that carriers in one portion cannot move into the other portion.

In the absence of a magnetic field, excess carriers flow through the semiconductor unit and appear equally at electrodes 35 and 36, so that no differential signal is available to meter 46. In the presence of a magnetic field having a component parallel to the axis of groove 34, as indicated by the arrow 85 in FIG. 2, the carriers are deflected from their normal paths, however, so that more of them cross the depletion layer boundary on one side of groove 34 than on the other. A differential signal then appears between electrodes 35 and 36 and is available for use by device 46. The same operation of course occurs in units 30 and 50.

It will be appreciated that when the magnetometer is so positioned that a field of interest is aligned with the groove in unit 30, it is substantially ineffective on the paths of the carriers in unit 50, and that while it does deflect the carriers in unit 10 laterally as seen in FIG. 2, it does not change the relative numbers of carriers reaching the two electrodes, and hence produces no differential output.

In the general case a magnetic field has components aligned with all three grooves 14, 34, and 54, and hence gives outputs on all three devices 26, 46, and 66, which consequently define the magnetic field jointly. Naturally a single unit gives an output representative, for any given field strength, of the angle between the field direction and the direction of the groove axis in that unit.

If on the other hand it is desired to measure the strength of a magnetic field, the magnetometer is positioned so that the field is aligned with a given axis, whereupon the output from the electrodes is representative of the desired field strength.

The embodiment of the invention shown in FIGS. 4 and 5 differs from the foregoing primarily in the manner of supplying excess carriers to the semiconductor material. Accordingly elements common to both embodiments are given in FIGS. 4 and 5 reference numerals greater by 100 than the same elements in FIGS. 1, 2, and 3.

The modified embodiment comprises a plurality of units 110, 130, and 150 back biased from battery 177 and supplying differential signals to utilization devices 126, 146, and 166. Excess carriers are supplied to these units by emitters 190 of n-type material, in cooperation with strata 112, 132, and 152. The emitters are provided with means 191 which make connection to conductors 192, which are in turn connected through resistors 193 and a switch 194 to the negative terminal of a second power source in the form of a battery 195 connected in series with battery 177.

Units 110, 130, and 150, may be thought of as transistors having a pair of collectors operating in different ratios depending on the ambient magnetic field. FIG. 5 presents these units, with batteries 177 and 194 and output circuits 123, 143, and 163, in a conventionalized schematic for better making plain the nature and operation of my invention.

In addition, sources of alternating current may be inserted in the emitter-base circuits so that meters 126, 146, and 166 may be alternating current amplifiers.

As in FIG. 1, the magnetometer of FIG. 4 gives three outputs jointly representative of the direction and strength of the ambient magnetic field.

Details of the structure and function of my invention have been set forth in the foregoing description, and the novel features thereof are pointed out in the appended claims. The foregoing description and the drawing are illustrative of my invention, which I now claim as follows:

1. In a magnetometer, in combination:
   at least one junction diode comprising a wafer of semiconductor material having a first, thin, relatively low resistivity stratum of one conductivity type contiguous with a second, thick, externally grooved, relatively high resistivity stratum of the opposite conductivity type to produce a depletion layer normally terminating within said second stratum between said first stratum and the bottom of the groove in said second stratum;
   reverse biasing means, connected across said junction diode, one terminal of said reverse bias means being electrically connected to said first stratum and another terminal of said reverse bias means being electrically connected to the portions of said second stratum separated by said groove, for causing the boundary of said depletion layer in said second stratum to move away from said first stratum and beyond the bottom of said groove, whereby to electrically isolate said portions of said second stratum;
   means operable to maintain a supply of excess carriers in said first stratum;
   means mounting said diode for exposure to a magnetic field, so that when said field has no component parallel to the axis of said groove said carriers flow equally between said first stratum and said portions of said second stratum;
   and means connected to said portions and responsive to inequality of said carrier flow to said portions as an indication of change in the magnetic field.

2. In a magnetometer, in combination:
   at least one junction photodiode comprising a wafer of semi-conductor material having a first, thin, relatively low resistivity stratum of one conductivity type contiguous with a second, thick, externally grooved, relatively high resistivity stratum of the opposite conductivity type to produce a depletion layer normally terminating within said second stratum between said first stratum and the bottom of the groove in said second stratum;
   reverse biasing means, connected across said junction diode, one terminal of said reverse bias means being electrically connected to said first stratum and another terminal of said reverse bias means being electrically connected to the portions of said second stratum separated by said groove, for causing the boundary of said depletion layer in said second stratum to move away from said first stratum and beyond the bottom of said groove, whereby to electrically isolate said portions of said second stratum;
   means operable to irradiate the surface of said first stratum with energy of a wavelength suitable to photo-electrically maintain a supply of excess carriers therein;

means mounting said diode for exposure to a magnetic field, so that when said field has no component parallel to the axis of said groove said carriers flow equally between said first stratum and said portions of said second stratum;

and means connected to said portions and responsive to inequality of said carrier flow to said portions as an indication of change in the magnetic field.

References Cited

UNITED STATES PATENTS

| | | | |
|---|---|---|---|
| 2,991,366 | 7/1961 | Salzberg | 179—100.2 |
| 3,135,199 | 6/1964 | Brown | 324—43 |
| 3,389,230 | 6/1968 | Hudson | 324—46 |
| 3,344,324 | 9/1967 | Beale | 338—32 |

FOREIGN PATENTS

| | | |
|---|---|---|
| 659,653 | 10/1951 | Great Britain. |
| 805,926 | 12/1958 | Great Britain. |

OTHER REFERENCES

Banzhaf et al.: The Photo Magnetic Electric Effect in Germanium as a Pickup Means for Magnetic Tape; IRE Transactions on Audio; September–October 1962, pp. 129–132.

RUDOLPH V. ROLINEC, Primary Examiner

R. J. CORCORAN, Assistant Examiner

U.S. Cl. X.R.

307—309